No. 885,617. PATENTED APR. 21, 1908.
C. A. HANSON.
MOTOR SLEIGH.
APPLICATION FILED FEB. 28, 1907.
4 SHEETS—SHEET 1.
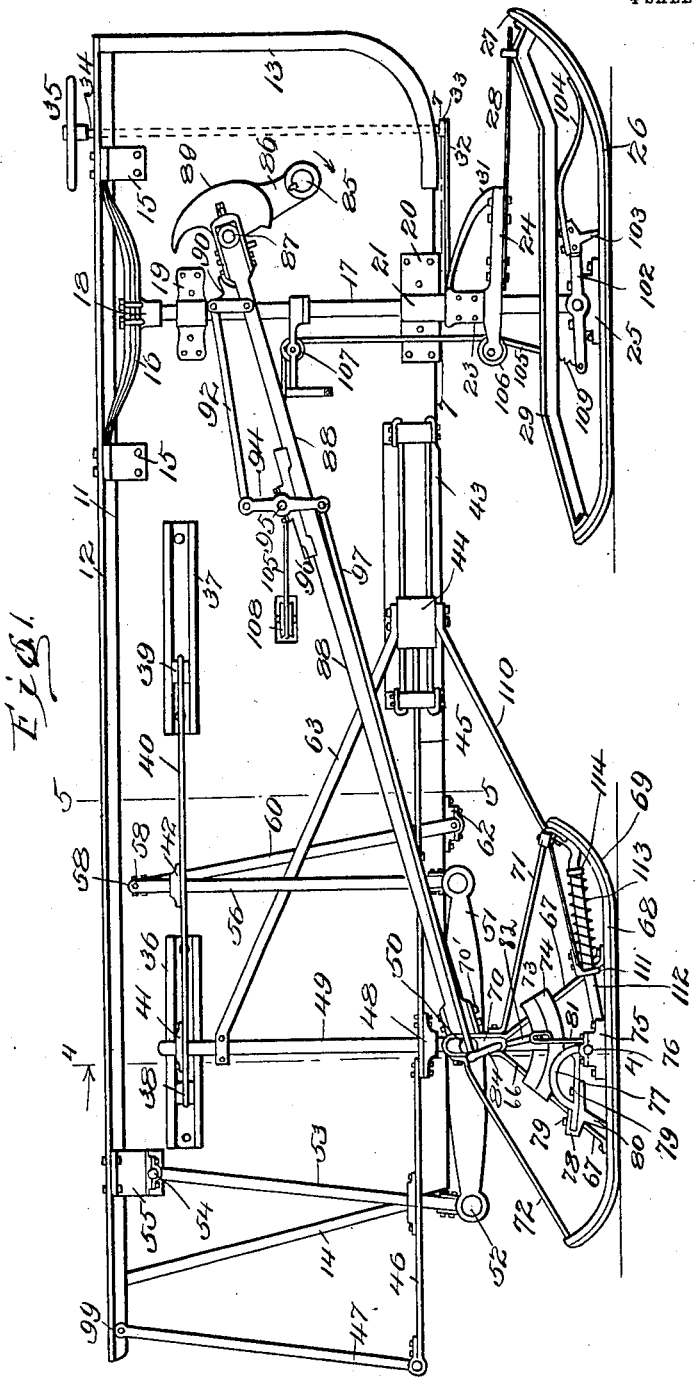
Witnesses
Inventor:
Carl A. Hanson
By Mason Fenwick Lawrence Attorney No. 885,617. PATENTED APR. 21, 1908.
C. A. HANSON.
MOTOR SLEIGH.
APPLICATION FILED FEB. 28, 1907.
4 SHEETS—SHEET 2.
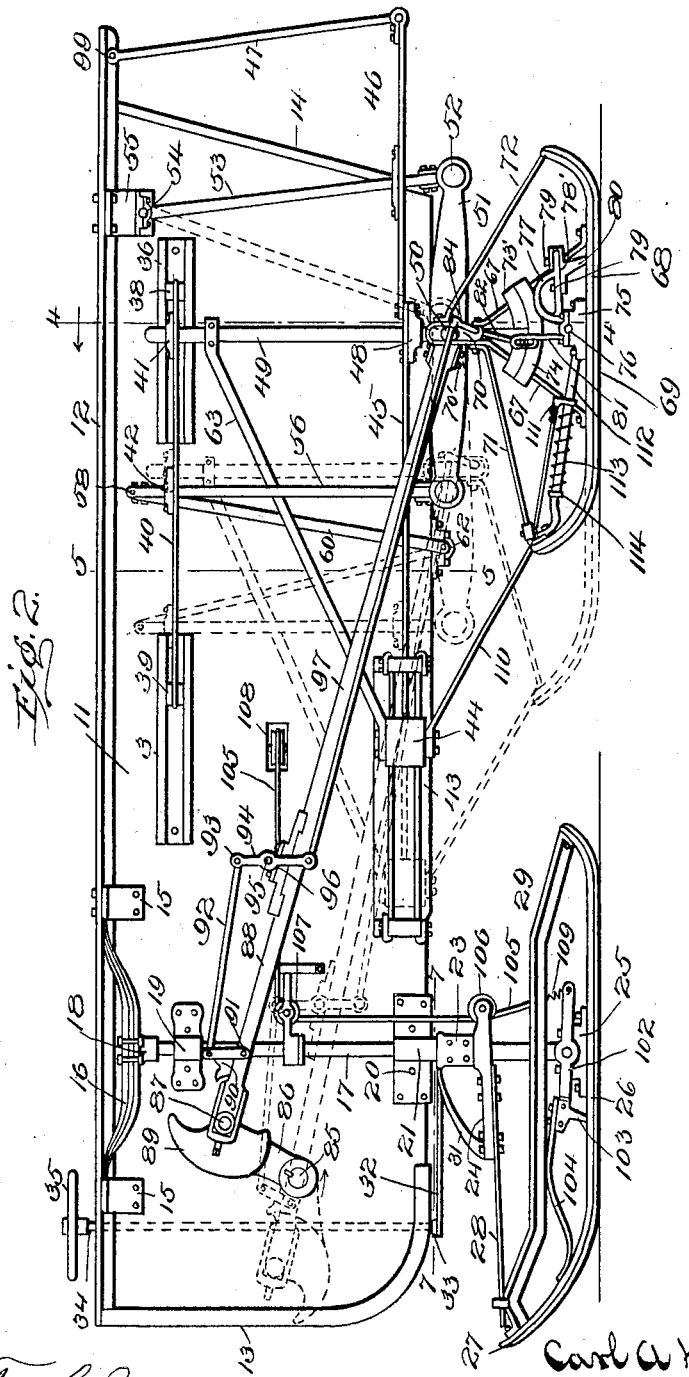

No. 885,617. PATENTED APR. 21, 1908.
C. A. HANSON.
MOTOR SLEIGH.
APPLICATION FILED FEB. 28, 1907.
4 SHEETS—SHEET 3.
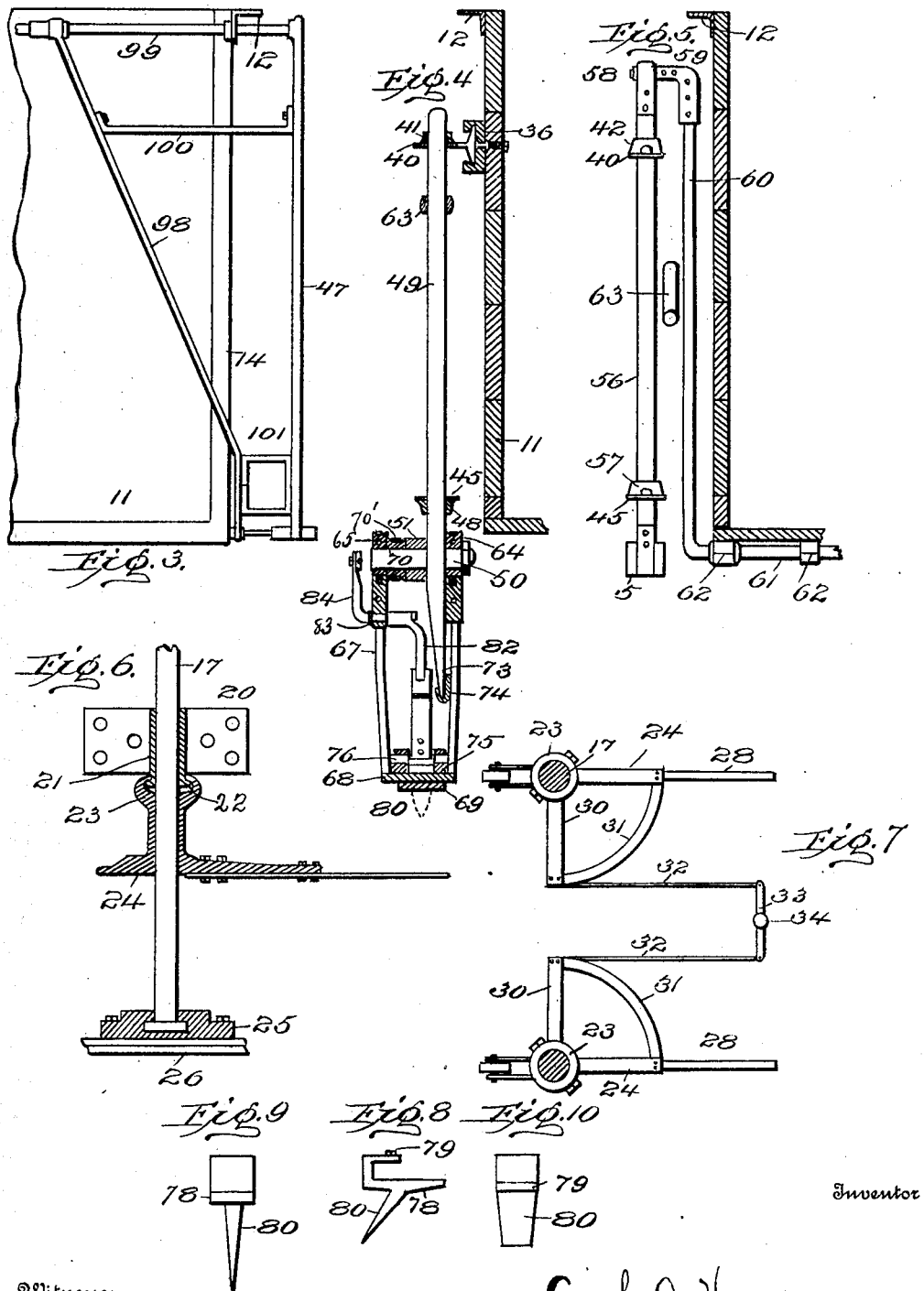

No. 885,617. PATENTED APR. 21, 1908.
C. A. HANSON.
MOTOR SLEIGH.
APPLICATION FILED FEB. 28, 1907.
4 SHEETS—SHEET 4.
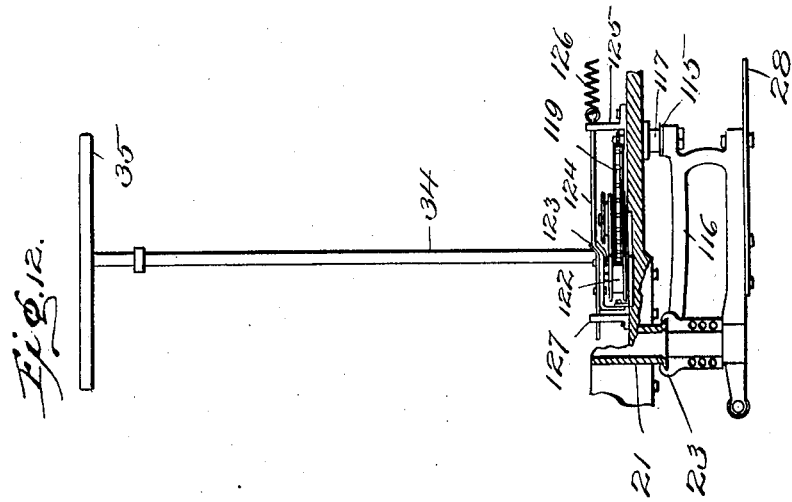
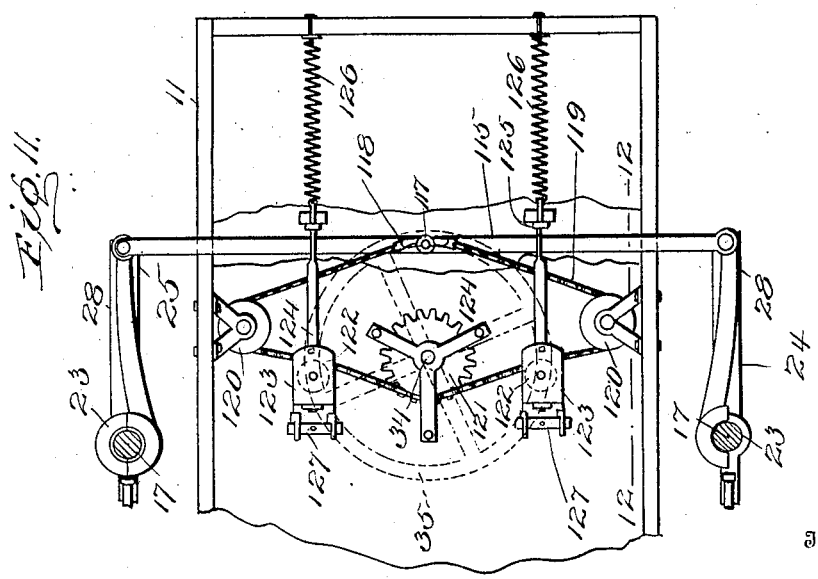

UNITED STATES PATENT OFFICE.

CARL A. HANSON, OF SEATTLE, WASHINGTON.

MOTOR-SLEIGH.

No. 885,617.  Specification of Letters Patent.  Patented April 21, 1908.

Application filed February 28, 1907. Serial No. 359,789.

*To all whom it may concern:*

Be it known that I, CARL A. HANSON, a subject of the King of Sweden, residing at Seattle, in the county of King and State of Washington, have invented certain new and useful Improvements in Motor-Sleighs; and I do hereby declare the following to be a full, clear, and exact description of the invention, such as will enable others skilled in the art to which it appertains to make and use the same.

This invention relates to motor sleighs and has for an object to provide a device of the class embodying new and improved features of economy, reliability and convenience.

A further object of the invention is to provide in a motor sleigh front and rear runners so associated that the rear runners may be by improved means advanced independently and with improved means for engaging the snow or earth for preventing the return movement of the runner and providing for the forward movement of the sleigh body.

A further object of the invention is to provide in a motor sleigh improved pivoted means for maintaining the body and rear runners in relatively horizontal position during longitudinal movements of the runners.

A further object of the invention is to provide in a motor sleigh improved means for operating a dog or other detent for engaging the snow or earth.

A further object of the invention is to provide in a motor sleigh forward runners independently rotatable in a horizontal plane and improved means controlled by the steering apparatus for moving the runners.

A further object of the invention is to provide in a motor sleigh a foot operated brake of improved construction.

A further object of the invention is to provide in a sleigh a sleigh body having a standard extending upwardly along the side of the body and with improved means connecting the standard with the runner and arranged to permit oscillation of the runner relative to the standard.

With these and further objects in view the invention comprises certain novel constructions, combinations and arrangement of parts as will be hereinafter described and claimed.

In the drawing,—Figure 1 is a view in side elevation of the improved motor sleigh. Fig. 2 is a view of the improved motor sleigh in side elevation taken from the side opposite Fig. 1, and showing the movement of the movable parts in dotted lines. Fig. 3 is a fragmentary view of the improved motor sleigh showing the rear end of the body and associated parts. Fig. 4 is a vertical sectional view of the improved sleigh taken on the line 4, 4 of Figs. 1 and 2. Fig. 5 is a vertical sectional view taken through the body and movable parts as on line 5, 5, of Figs. 1 and 2. Fig. 6 is a detail view of the swivel connection between one of the forward runners and its associated standard. Fig. 7 is a top plan view of the steering-gear-connecting means taken on line 7, 7 of Figs. 1 and 2, and showing the standard and steering spindle in transverse section. Fig. 8 is a view in side elevation of one of the dogs or detents employed for preventing return of the runner. Fig. 9 is a view in rear elevation of one form of dog showing a sharp point for engagement with hard ice or snow. Fig. 10 is a rear elevation of the dog showing a chisel-like point for engagement with soft snow and the like. Fig. 11 is a top plan view of a different form of steering gear with the body broken away to more clearly show the connecting bar beneath. Fig. 12 is a view in side elevation of the steering gear taken on line 12—12 of Fig. 11.

Like characters of reference designate corresponding parts throughout the several views.

The improved sleigh forming the subject matter of this application comprises a body 11 of any approved size, shape, material and structure, and conventionally herein shown as provided with a top rail 12 preferably of angle iron and with a curved front 13 and sloping back 14.

Adjacent the forward end of the body 11 brackets 15 are rigidly secured to the rail 12 and thereto is connected a spring 16. To the spring 16 a standard 17 is rigidly affixed, as at 18, movable longitudinally and vertically through guides 19 and 20, preferably rigidly secured to the side of the body 11.

The lower guide block 20 is provided with a sleeve 21 having an out-turned flange 22 embracing the standard 17, and upon the flange 22 is swiveled a sleeve 23 rigidly secured at its lower end to a bar 24 through which said sleeve 23 and bar 24 extends the standard 17, the said sleeve 23 and bar 24 being rotatable on the said standard.

At its lower end the standard 17 connects by means of a thrust bearing 25 with the forward runner 26, the forward end of which runner, as at 27, is connected by means of a resilient bar 28 with the bar 24. The runner 26 is braced and strengthened by the employment of any improved form of brace as shown conventionally at 29.

It will be noted that the forward runners upon each side of the sleigh body are similar and are here similarly numbered, and that each of the members carrying the bar 24 has a laterally extending brace bar 30 connected with the bar 24 through the medium of a curve or segmental bar 31, to form by the association of the bars 24, 30 and 31 substantially a quadrant. To the extremities of the bars 30 are pivoted links 32 extending in either direction, but here shown as extending forwardly and pivoted to a cross head 33 carried rigidly upon the lower extremity of the spindle 34, carrying at its upper end a steering wheel or handle 35. Adjacent the rear of the body 11 is affixed a guide 36 with a similar guide 37 affixed to the body intermediate its ends, and with the guide-ways of the two guides substantially in alinement and preferably in parallelism with the rail 12. Within the guides 36 and 37 are respectively slidably mounted cross heads 38 and 39 joined by means of a flat bar 40 extending preferably in parallelism with the rail 12 and provided adjacent the head 38 with an opening protected by a boss member 41, and intermediate its ends by a similar opening strengthened by a similar boss member 42.

Adjacent to the lower edge of the body 11 is affixed a guide 43 having a cross head 44 slidably mounted in association therewith and with a flat bar 45 extending rearwardly therefrom and by means of a resilient bar extension 46 projected beyond the rear end of the body and supported by means of a link 47 from the rearward extremity of the rail 12. Adjacent the connection between the resilient bar 45 and its extension 46 is provided an opening protected and strengthened by a boss member 48 and firmly fixed thereto and through said boss member 48 and the boss member 41 is inserted the standard 49, capable of a limited vertical, longitudinal movement through 41 only.

Adjacent the lower side of the body 11 the standard 49 is provided with a transversely and laterally extending pivot pin 50 upon which is pivotally mounted a cross head or walking beam 51 extending normally substantially in parallelism with the bottom of the body. At its rearward end the walking beam 51 is pivoted, as at 52, to a link 53 which in turn is pivoted as at 54 to a bracket 55 rigidly secured to the body at or adjacent the top rail 12. At its forward end the walking beam 51 is pivoted to a standard 56 which said standard passes upwardly through the resilient bar 45 and the strengthening boss member 57 and through the resilient bar 40 and boss member 42. At its upper end the standard 56 is pivoted, as at 58, to an elbow 59 carried rigidly upon the upper end of a link 60 pivoted beneath the sleigh body by means of an offset 61 journaled within bearings 62. The upper end of the standard 49 is held rigid against movement longitudinally of the sleigh by means of an inclined brace 63 embracing the said standard loosely but rigidly secured at its lower end to the cross head 44 and movable therewith.

Pivoted upon the pin 50 upon opposite sides of the walking beam 51 are blocks 64 and 65 carrying respectively diverging braces 66 and 67 connected at their lower ends with opposite sides of the rear runners. The rear runners comprise preferably runner members 68 and shoes 69 to the former of which are preferably rigidly secured the braces 66 and 67. Between the block 65 and the walking beam 51 is also pivoted a block 70 to which is secured a piston rod as hereinafter described. Diverging braces 71 and 72 are also secured to the block 65, the former extending to and connected with the runner at its forward upturned end and the latter extending to and connected with the runner at its rearward end. It will thus be seen that the runner member comprising the runner and shoe and its several braces is pivoted upon the pin 50 arranged to oscillate relatively to the standard 49 and walking beam 51, and such oscillatory movement is permitted by means of a segment 73 slidably engaged within a segmental guide 74, the former being carried rigidly upon the lower extremity of the standard 49, and the latter carried rigidly by the runner member.

Upon the runner is rigidly mounted a bearing block 75 having pivoted therein a rock shaft 76 rigidly connected with a frame 77 carrying a dog 78 removably secured thereto in any approved manner as by the bolts 79, and provided with a spike or other earth or snow engaging means 80 positioned to pass through an opening in the runner 68 and shoe 69 and to project beneath the runner into the snow or earth. To operate the frame 77 and dog 78, a spring 81 is employed provided with a slotted upper end engaged by one arm 82 of a lever pivoted, as at 83, in the block 65 and with an upstanding arm 84 preferably upon the outer side of the said block.

To propel the vehicle a positively rotated shaft 85 is provided driven by any approved means and provided without the body with a crank arm 86 and connected by means of a wrist pin 87 with a pitman rod 88 extending transversely downward and connected with the pivoted block 70 by means of the strap 70′ hereinbefore referred to.

The crank arm 86 is provided with a cam 89 positioned to engage with a wiper 90 pivoted to the pitman rod 88, as at 91, and with a link 92 extending rearwardly from the said wiper 90 and pivoted as at 93 to a lever or walking beam 94 pivoted, as at 95, to a bearing block 96, carried rigidly upon the pitman rod 88. To the lower end of the walking beam 94 is pivoted a link 97 extending rearwardly and downwardly substantially in parallelism with the pitman rod 88 and connected at its rearward and lower end with the arm 84.

To prevent lateral movement of the walking beams 51 and standard 49, an inclined brace bar 98 is rigidly connected with the link 47, and by means of a transverse shaft 99 with the upper transverse edge of the body. The link 47 and brace bar 98 are strengthened in any approved manner as by the transverse brace 100 and the block 101 rigidly secured therebetween.

Upon the bearing block 25 of the forward runner is fulcrumed a lever 102 having at its forward end a spike or dog 103 positioned to be inserted through the runner 26 and held normally above the runner by any approved means as the spring 104. The dog 103 serves as a brake to engage the snow or earth beneath the runner 26 and is controlled by means of a cord or cable 105 running upon any approved system of guide rollers, as 106, 107 and 108 into the body for manipulation by the operator. To prevent undue strain upon the structure the cord or cable 105 is preferably connected with the lever 102 by means of a spring or other resilient member 109. To further guide and control the forward end of the rear runner, a brace bar 110 is connected to the cross head 44 and extending rearwardly and downwardly is provided with an elbow 111, embracing a guide bar 112 and with a spring 113 interposed between the elbow 111 and a collar 114 rigidly carried upon the said guide bar 112.

Instead of employing the steering gear shown in Fig. 7, a steering gear as shown in Figs. 11 and 12 is preferably made use of. As shown particularly in Fig. 11 the forward ends of the braces 24 are connected by means of a link 115 extending transversely across beneath the body of the sleigh and preferably by means of the employment of a frame-work as shown at 116, which is connected to the resilient bar 28 of the runner.

Adjacent its middle the link 115 is provided with a pin 117 extending upwardly through a segmental slot 118 in the bottom of the body and connected with a chain 119, which said chain extends about idlers 120 at opposite sides of the body and over a sprocket 121 adjacent the middle of the body. Rigidly connected with the sprocket 121 is the steering spindle 34 having the steering wheel or handle 35 at its upper end.

To insure a proper engagement of the chain 119 with the sprocket 121 chain tighteners 122 are employed bearing against the rearward side of the chain and journaled in U-shaped blocks or stirrups 123. The U-shaped blocks 123 are mounted upon bars 124 arranged to slide in brackets 125 under the action of springs 126. At the end opposite the spring 126 the bars 124 extend slidably through brackets 127 whereby the chain tighteners 122 are constantly under resilient pressure upon the rearward side of the chain and adapted to hold the chain in operative engagement with the sprocket 121 and to take up shocks received upon the runners by reason of contact with obstructions.

In operation the positively driven shaft 85 is rotated in the direction indicated by the arrow in Figs. 1 and 2, and the pitman rod 86 moving therewith moves the rear runner and cross head forwardly and backwardly in response to such movement. At its forward movement the runner and associated parts move to the position shown in dotted lines in Fig. 2, the full line position not showing the runner at its extreme rearward movement as plainly indicated by the position of the crank arm 86. It will be noted that the link 53 moves about an arc from the pivot pin 54 so that the pivot pin 52 is lower at the middle than at either extreme of its movement. The rearward end of the walking beam 51 is therefore given a slightly pivotal movement upon the pin 50 and the movement of the opposite end of the walking beam is exactly the reverse of that of the rearward end and such movement is accommodated by means of the link 60 being pivoted at 62, and the pivot point 58 moving in an arc from the center at 62 so that while the extremities of the walking beam 51 move alternately upwardly and downwardly during each stroke of the piston rod 88, the center or pin 50 travels upon a horizontal line.

When the runner is at its extreme forward limit, as indicated in dotted lines, the cam 89 engages the wiper 90 and through the medium of the links and levers above described forces the dog 80 through the runner 68 and shoe 69 into the earth or snow beneath, the spring 81 permitting the engagement of the dog with solid substance without fracturing the parts. The cam 89 remains in engagement with the wiper 90 and thus maintains the dog 80 in engagement with the snow or earth until the rear runner has reached its extreme rearward movement. When the cam passes from engagement with the wiper, the dog 80 is thrown out of engagement with the earth and the runner again drawn forward to dotted position.

It will be understood that the crank arms 86 upon opposite sides of the vehicle are oppositely disposed so that while one rear runner is being drawn forwardly the opposite rear runner is being forced rearwardly or by reason of the engagement of the dog 80 with the snow or earth, the runner remains stationary and the body of the vehicle is forced forward. By this means while the movement of the runner has been described as rearwardly, it does as a matter of fact not move rearwardly but after accomplishing this forward movement remains stationary, the rearward movement being only relatively to the body and not actually relative to the earth.

What I claim is:—

1. In a motor sleigh, reciprocating runners, a walking beam supported upon one of the runners, and links pivotally connected with opposite ends of the walking beam.

2. In a motor sleigh, reciprocating runners, a walking beam supported upon the runner and in normal alinement with the body, and links pivoted upon the body and pivotally connected with opposite ends of the walking beam.

3. In a motor sleigh, a body, reciprocating runners, a walking beam supported centrally upon a runner, and links pivoted to the body and pivotally connected with opposite ends of the walking beam.

4. In a motor sleigh, a body, reciprocating runners disposed beneath the body, a walking beam fulcrumed centrally upon one of the runners, a link pivoted upon the body and pivotally connected with one end of the walking beam, a standard pivotally connected to and extending above the opposite end of the walking beam, and a link pivoted to the body and pivotally connected with the upper end of the standard.

5. In a motor sleigh, a body, reciprocating runners disposed beneath the body, a standard mounted to oscillate upon and extending above each of the runners, guides formed upon the body, means carried by the guide for controlling the position of the standard, a walking beam extending longitudinally of the body and fulcrumed centrally upon one of the runners, a link pivoted to the body and pivotally connected with one end of the walking beam, a standard pivoted to the opposite end of and extending above the walking beam, a link pivoted adjacent the lower edge of the body and having its upper end pivoted to the upper end of the pivoted standard, and means to reciprocate the runner and walking beam.

6. In a motor sleigh, reciprocating runners, a dog carried by one of the runners, a positively rotating shaft, a pitman rod operated by the shaft and connected with the runner, means upon the pitman rod for operating the dog, and a cam carried by the shaft adapted to engage and actuate the dog operating means.

7. In a motor sleigh, a body, reciprocating runners, disposed beneath the body, a dog carried by a runner and adapted to be moved into engagement with the earth, a positively rotated shaft carried by the body, a crank arm carried upon the shaft, a pitman connecting the crank arm and runner and adapted to reciprocate the runner, a wiper pivoted upon the pitman, means connecting the wiper and the dog operating means, and a cam carried by the crank arm and positioned to engage and actuate the wiper.

8. In a motor sleigh, a body, a reciprocating runner, provided with an opening, a bearing block secured upon the runner, a frame pivoted upon the bearing block, a dog carried by the frame and positioned and proportioned to be inserted downward through the opening in the runner, a lever adapted to move the frame, a positively rotated shaft carried upon the body, a pitman connecting the positively rotated shaft with and adapted to move the runner, means carried upon the pitman for actuating the lever, and a cam carried by the shaft, and adapted to engage and actuate the lever actuating means.

9. In a motor sleigh, a body, reciprocating runners, each provided with an opening, a block rigidly secured upon a runner, a frame pivoted upon the block, a dog carried by the frame positioned and proportioned to be inserted downward through the opening in the runner, a resilient arm extending upwardly from the frame, a lever engaging the resilient arm and adapted to actuate the frame, a positively driven shaft carried by the body, a crank arm carried by the shaft, a pitman connecting the crank arm with and adapted to reciprocate the runner, a wiper pivoted upon the pitman, links connecting wiper and the lever, and a cam carried by the crank arm and adapted to engage and actuate the wiper.

10. In a sleigh, a body, a runner beneath the body, a walking beam fulcrumed centrally upon the runner, a link pivoted to one end of the runner and adapted to move in an arc from a center adjacent the upper side of the body, and a link pivotally connected with the opposite end of the runner and pivoted to move in an arc from a center adjacent the bottom of the body.

11. In a sleigh, a body, a standard extending vertically adjacent the body and connected with a spring at its upper end, a runner carried at the lower end of the standard, a sleeve rotatably embracing the standard, and connected with the runner, an arm carried by the sleeve and extending transversely of the body, a steering cross-head pivoted upon the body, and a link connecting one end of the cross-head with the arm.

12. In a sleigh, a body, a guide rigidly secured to the side of the body, a runner mounted beneath the body and adapted to reciprocate, a cross-head mounted upon the guide, a rod mounted upon the runner; a brake bar extending from the cross-head to and embracing the rod, and a cushioning member carried by the rod and positioned to exert tension upon the brake bar.

13. In a motor sleigh, a body, runners disposed beneath the body, and mounted to reciprocate, a positively rotated shaft carried by the body, and pitman rods pivotally connected with the shaft and adapted to reciprocate the runners alternately.

14. In a motor sleigh, a body, runners mounted beneath the body and adapted to reciprocate, means carried by the body adapted to reciprocate the runners alternately, means carried by the runners for engaging the earth, and means adapted to alternately raise and lower the earth engaging means as the runners are reciprocated.

15. In a motor sleigh, a body, runners mounted beneath the body and adapted to reciprocate, means carried by the body adapted to reciprocate the runners alternately, means carried by the runners adapted to engage the earth, and means adapted to move the earth engaging means into engagement when the runner is in its forward limit and disengage it when at its rearward limit.

In testimony whereof I affix my signature in presence of two witnesses.

CARL A. HANSON.

Witnesses:
G. WARD KEMP,
L. C. MASSIE.